June 14, 1955  W. H. DU SHANE ET AL  2,710,546
CHANGE-SPEED TRANSMISSION
Filed July 14, 1954  2 Sheets-Sheet 1
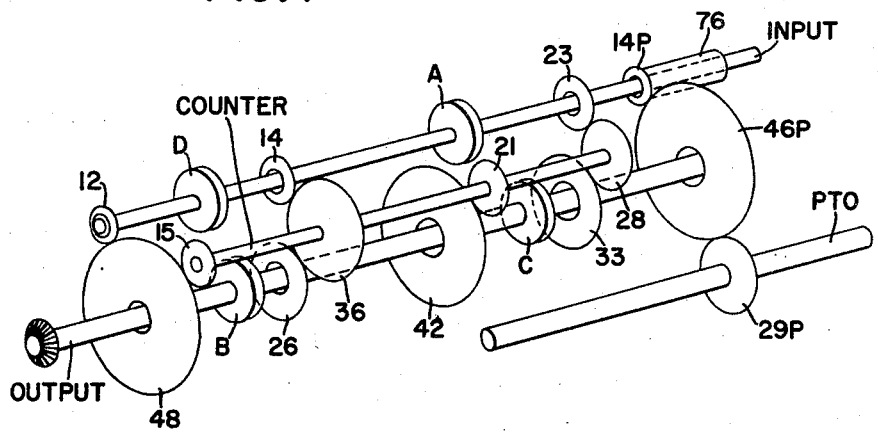
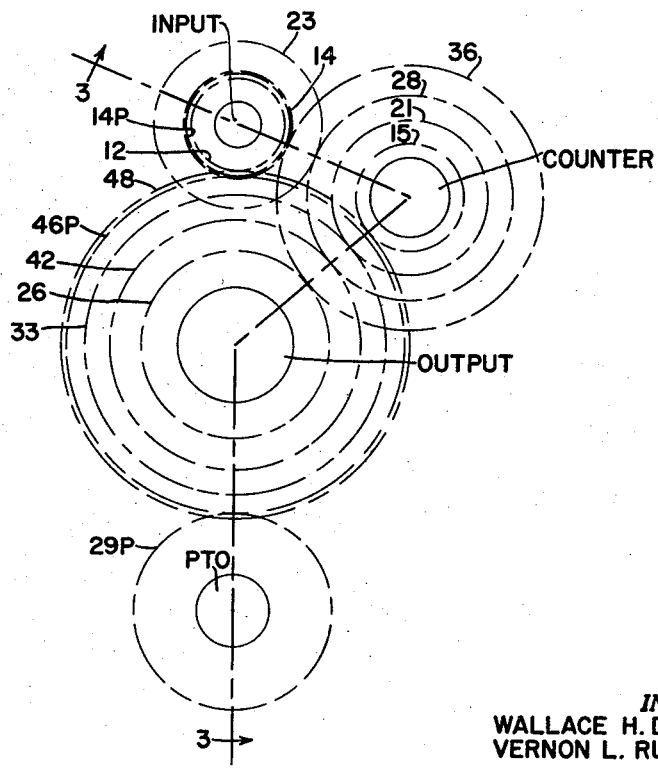
*INVENTORS*
WALLACE H. DU SHANE
VERNON L. RUGEN

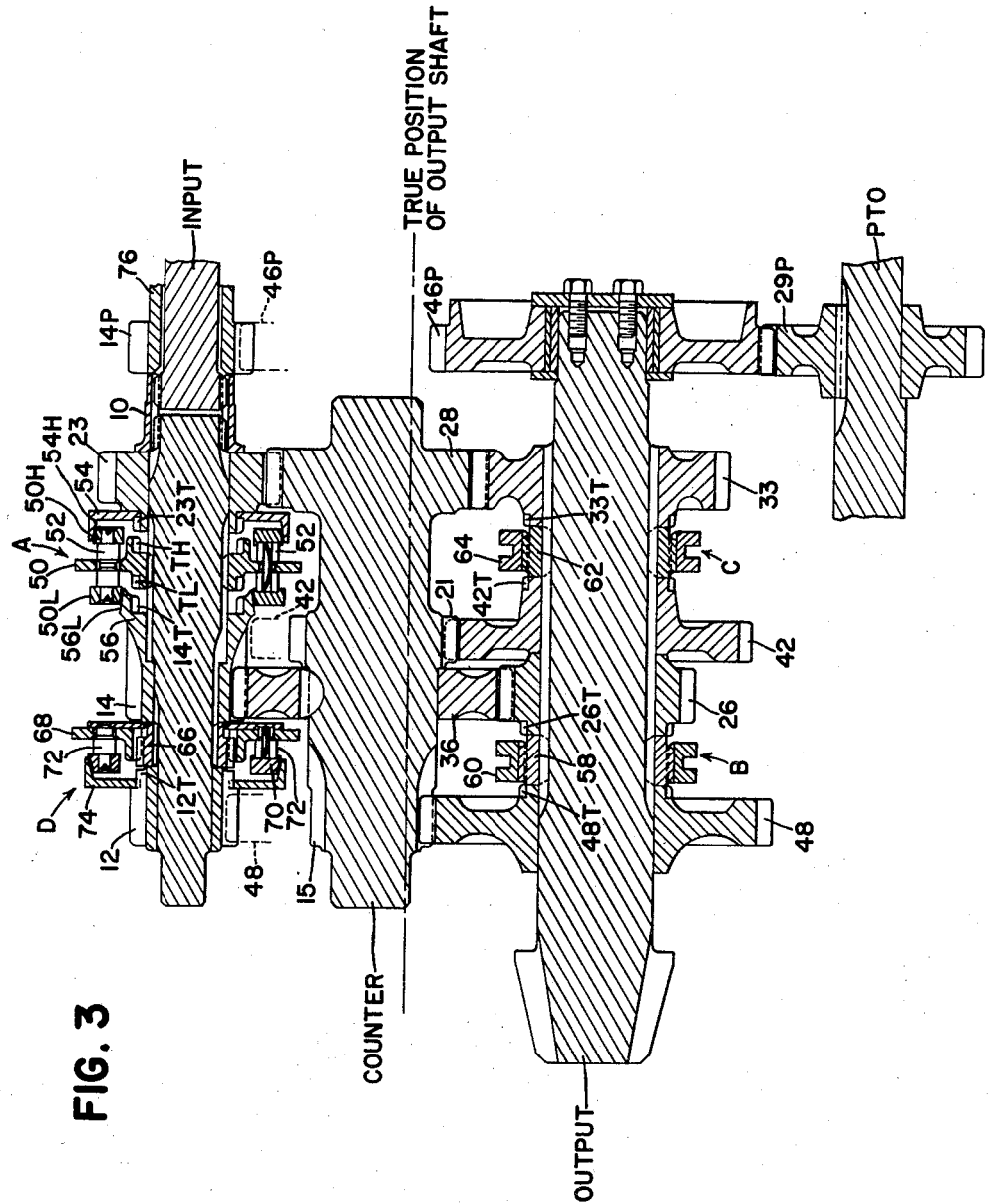

United States Patent Office 2,710,546
Patented June 14, 1955

2,710,546

CHANGE-SPEED TRANSMISSION

Wallace H. Du Shane, Waterloo, and Vernon L. Rugen, Cedar Falls, Iowa, assignors to Deere Manufacturing Co., Dubuque, Iowa, a corporation of Iowa Application July 14, 1954, Serial No. 443,352

10 Claims. (Cl. 74—360)

This invention relates to a change-speed transmission and more particularly to an improved transmission having a plurality of speed ratios achieved by the use of a relatively small number of gears. Still more particularly, the invention features a transmission of the type in which a plurality of speed ratios are obtainable in a plurality of ranges.

Many types of vehicular transmissions are known in which speed ratios are doubled by the use of a dual-range mechanism which establishes a high speed or a low speed for a driving shaft and superimposed on this arrangement are a plurality of selective speed-change gears by means of which the transmission has an equal number of speeds in either range. In many transmissions of this type, only one or perhaps two at the most speeds may be obtained in reverse, and in any case a separate reverse idler must be used to achieve reverse. According to the present invention, reverse is obtained in a plurality of speed ratios equal to one-half the number of the forward speed ratios by a simple arrangement that utilizes one of the output gears that is in constant mesh with a counter-shaft gear and also in constant mesh with a reverse pinion journaled on the input shaft, thus avoiding the use of a separate reverse idler. The invention has for a further feature the use throughout of constant-mesh gears, employing dental clutches for achieving selective connection of any one gear to its associated shaft. A significant feature of the invention is the utilization in the dual-range clutch of synchronizing means whereby the dual range may be used to achieve either a step-up or step-down result, whereby the operator may change speed ratio without shifting gears on the final or output shaft, which is normally required in a situation in which the vehicle is not quite able to lug out the load in the gear originally selected in the higher range. It is an over-all object of the invention to provide an improved and relatively inexpensive transmission in which a relatively large variety of speed ratios may be obtained with a minimum number of gears.

The foregoing and other important objects and desirable features inherent in and encompassed by the invention will become apparent as a preferred embodiment of the invention is disclosed in detail in the following specification and accompanying sheets of drawings, the several figures of which will be described immediately below.

Fig. 1 is a schematic perspective view of the transmission.

Fig. 2 is an enlarged end elevation of the transmission, showing the positions of the shafts and illustrating also the pitch circles of the various gears.

Fig. 3 is a developed sectional view as seen along the line 3—3 of Fig. 2.

In the interests of brevity and clarity, housing portions of the transmission have been omitted. The various shafts of the transmission are designated simply "input," "counter" and "output" without the use of additional reference characters. The various gears are numbered on the basis of the respective number of teeth possessed thereby, whereby the various speed ratios may be more readily comprehended.

With the foregoing in mind, the improved transmission may be readily understood as comprising an input shaft, a countershaft and an output shaft, these shafts being parallel to each other. The countershaft has axially spaced thereon and fixed thereto a small countershaft gear 15, a large countershaft gear 36, an intermediate countershaft gear 28 and a fourth countershaft gear 21. As indicated, the countershaft gears 15, 21 and 28 may be integral with the countershaft and the gear 36 may be keyed to the countershaft; although, these details are largely immaterial.

The output shaft has axially spaced and independently journaled thereon a plurality of output gears comprising a large output gear 48 in constant mesh with the small countershaft gear 15, a small output shaft gear 26 in constant mesh with the large countershaft gear 36, an intermediate output gear 33 in constant mesh with the intermediate countershaft gear 28, and a fourth output gear 42 in constant mesh with the fourth countershaft gear 21. The relative axial positions of the gears 48, 42, 33 and 26 on the output shaft may be maintained by any suitable means, no example of which is illustrated here but many examples of which, such as snap rings and the like, will be familiar to those skilled in the art.

The input shaft is shown as comprising a pair of coaxial sections interconnected by an internally splined coupling 10, but the input shaft could as well be of one piece or any other construction. Journaled on the input shaft and spaced axially apart are a low-range input pinion 14 and a high-range input pinion 23. The pinion 14 is in constant mesh with the large countershaft gear 36, which gear 36 may be designated as a low-range countershaft gear. The pinion 23 on the input shaft is in constant mesh with the intermediate countershaft gear 28, which thus establishes the countershaft gear 28 as a high-speed gear. The axially spaced relationship between the independently journaled input shaft pinions 14 and 23 may be maintained in any conventional manner, the details of which are immaterial here.

Also journaled on the input shaft is a reverse pinion 12, which is in axially spaced relation to the input pinion 14. The reverse pinion 12 is in constant mesh with the large output gear 48, as best shown in Fig. 1. Since the output gear 48 is in constant mesh with the small countershaft gear 15 (also Fig. 1), it follows that positive connection of the pinion 12 to the input shaft will drive the countershaft in a reverse direction, whereas positive connection of the input shaft to either of the input pinions 14 or 23 will drive the countershaft in a forward direction at one or the other of two different range ratios.

As indicated above, the section in Fig. 3 is a developed section, which displaces somewhat the true position of the axis of the output shaft. A dot-dash line labeled "True Position of Output Shaft" is used to clarify the situation. Dotted lines are also used in Fig. 3 to illustrate the true position of the large output gear 48 as being in constant mesh with the reverse pinion 12, an arrangement that will be apparent from Figs. 1 and 2.

For the purpose of driving the countershaft is a forward direction at either a low range or a high range, the transmission includes dual-range drive means comprising essentially a dual-range clutch A which embodies, for example, a central ring-like member 50 through which detent and blocker pins 52 project in axially opposite directions to carry respectively a low-speed friction ring 50L and a high-range friction ring 50H. The ring 50 has a central hub portion on one end of which are provided dental clutch elements or teeth TL and on the other end of which are provided dental clutch elements or teeth TH.

The large or high-range input pinion 23 has rigidly affixed thereto an annular member 54 in which is formed an internal annular friction surface 54H engageable at times by the friction ring 50H on the dual-range clutch A. The small or low-range input piston 14 has integrally formed therewith a hub extension 56 on which is provided an annular external conical friction surface 56L engageable at times with the friction ring 50L of the clutch A. The hub of the large input pinion 23 has external dental clutch elements or teeth 23T and internal elements or teeth 14T are formed on the hub of the small input pinion 14.

When the clutch A is in its neutral position as shown, it is axially centrally between the pinions 14 and 23 and the friction rings 50L and 50H are respectively clear of the friction surfaces 56L and 54H. When the clutch A is shifted to the left (as seen in Fig. 3), the friction ring 50L first contacts the friction surface 56L of the pinion 14. The hub of the clutch ring 50 is, of course, axially slidably keyed to the input shaft and, when frictional engagement is established between 50L and 56L, the relative speeds of rotation between the input shaft and the pinion 14 are altered to a status of synchronization so that engagement between the teeth 14T and TL may be effected without clashing, which is a well-known function of any synchronizer. The synchronizing means shown here is only representative and the specific characteristics thereof form no part of the present invention. Synchronizing is accomplished by the friction surfaces 50H and 54H when the clutch ring 50 is shifted to the right, thus eliminating clashing prior to engagement of the teeth TH and 23T. It will be understood that after synchronization has been achieved by means of the frictional surfaces, such as 50L—56L or 50H—54H, the force of the detent and blocker pins 52 will be overcome so that the ring 50 can continue in its axial direction to cause engagement of the positive dental elements 14T—TL or 23T—TH.

When the dual-range clutch effects engagement between the input shaft and the input pinion 14, for example, the countershaft is driven at a speed determined by the relative pitch diameters between the pinion 14 and the large countershaft gear 36. Thus, the countershaft gear 36 may be said to be part of the dual-range drive means. Likewise, when the clutch A is shifted to the right to establish a positive connection between the input shaft and the large input pinion 23, the countershaft will be driven at a higher speed determined by the ratio between the pitch diameters of the pinion 23 and the intermediate countershaft gear 28. Operation of the clutch A in one direction or the other is exclusive as well as selective; that is to say, both pinions 14 and 23 cannot be simultaneously connected to the input shaft.

Since the countershaft may be driven at either one of the two speed ratios mentioned above, it follows that any variety of selective speeds taken off from the countershaft may be doubled, which is just the result accomplished here. As previously outlined, the output shaft gears 26, 33, 42 and 48 are respectively in constant mesh with the countershaft gears 36, 28, 21 and 15. Therefore, if any one of the output shaft gears is positively connected to the output shaft, the output shaft will rotate at a speed determined by the ratio between the pitch diameters of the meshing and driving countershaft and output gears. For this purpose, the output shaft carries thereon first and second output shaft clutches B and C. The clutch B comprises a central or internal ring 58, splined or keyed to the output shaft intermediate the output gears 26 and 48. Each ring 58 is externally splined and carries for axial shifting thereon an internally splined outer ring 60, the internal splines of which serve as dental elements or teeth selectively and optionally engageable with hub teeth 48T on the output gear 48 or hub teeth 26T on the output gear 26, these elements, considering the clutch B as a double or independently arranged pair of clutches rather than a single one, comprising first and second clutch elements.

The clutch C comprises an internal ring 62 splined or keyed to the output shaft axially intermediate the output gears 33 and 42. In addition, the clutch C includes an external shiftable ring 64 internally splined to external splines on the ring 62, being therefore carried for axial shifting selectively in opposite directions for optional engagement with dental elements or teeth 42T on the hub of the output gear 42 or dental elements or teeth 33T on the hub of the output gear 33.

From the description thus far, it will be seen that the transmission produces eight forward speeds as follows.

| Gear | Power Train | Countershaft Speed |
|---|---|---|
| 1 | 14:36-15:48 | Low. |
| 2 | 14:36-21:42 | Low. |
| 3 | 23:28-15:48 | High. |
| 4 | 14:36-28:33 | Low. |
| 5 | 23:28-21:42 | High. |
| 6 | 14:36-36:26 | Low. |
| 7 | 23:28-28:33 | High. |
| 8 | 23:28-36:26 | High. |

The speed of the countershaft will be "low" when the synchronizing clutch A is shifted to the left to connect the pinion 14 to the input shaft via 14T and TL. The countershaft speed will be "high" when the synchronizing clutch A is moved to the right to connect the input shaft to the high-speed input pinion 23 via TH and 23T. It will be understood that with the clutch A in one or the other of its positions, four different speeds of the output shaft may be obtained by the use of the clutches B and C, the operation of these clutches being mutually exclusive so that no two output shaft gears are connected to the output shaft at any one time.

It will also be apparent from the above tabulation that if the transmission is operated in third gear, in which case the countershaft speed is "high," the operator may "step down" to first speed by shifting the synchronizing clutch A to the left. He may accomplish the same result in going or stepping down from fifth to second gear or from seventh to fourth, or from eighth to sixth. Because of the synchronizing characteristic of the clutch A, these speed changes may be readily effected and are especially beneficial in road or field transport, enabling starting in sixth speed and later shifting quickly to eighth, for example, or shifting down from eighth to sixth to increase the braking effect of the engine in stopping or slowing the vehicle.

The novel reverse arrangement not only utilizes the small countershaft gear 15 and the large output gear 48 but accomplishes a plurality of reverse speed ratios without the addition of a separate reverse idler. The reverse pinion 12, as previously described, is in constant mesh with the large output gear 48 and that gear is in turn in constant mesh with the small countershaft gear 15. It follows, therefore, that if the reverse pinion 12, which is journaled on the input shaft, is positively connected to the input shaft it will effect reverse rotation of the countershaft and reverse rotation of the output shaft. For the purpose of effecting connection and disconnection between the input shaft and the reverse pinion 12, the transmission has a reverse clutch designated generally by the letter D. This clutch comprises an internal ring 66 splined or keyed to the input shaft and externally splined to carry an internally splined outer ring 68, the internal splines of the outer ring serving as dental clutch elements or teeth selectively engageable with or disengageable from hub teeth 12T on the reverse pinion 12. In addition to the dental clutch element, the reverse clutch D includes synchronizing means comprising a friction ring 70 carried by the ring 68 by means of detent and blocker pins 72. The friction ring 70 is engageable with a cooperative friction annulus 74 keyed to the pinion 12. The arrangement is similar to one-half of the high-low clutch A. The reverse clutch D is, of course, selectively and exclusively connectible, which is to say that it is not engaged unless the high-low clutch A is in neutral. The reverse clutch may be engaged at any time irrespective of whether or not the output shaft clutches B or C are engaged, thus giving the operator the ability to utilize the same speeds in forward and reverse, which selection he may quickly effect by means of the clutch D.

One speed in reverse is obtained directly by the constant-mesh engagement between the reverse pinion 12 and the output shaft gear 48. If the clutch B is shifted to the left to effect positive engagement at 48T, the output gear 48 will then be connected to the output shaft and the reverse speed of rotation of the output shaft will depend upon the ratio between the pitch diameters of the reverse pinion 12 and the output gear 48. During this stage of operation, the countershaft will rotate idly in a reverse direction because of the constant mesh between the output gear 48 and the small countershaft gear 15, it being understood that the clutch C is in its central position and the clutch B, being engaged with the teeth 48T on the output gear 48, will be free from the teeth 26T on the output gear 26.

An additional speed ratio in reverse may be obtained by shifting of the clutch B to the right, to establish engagement at 26T, wherefore the reverse speed of rotation of the output shaft will depend upon the ratio between the pitch diameters of the gears 48 and 15 as well as the ratio between the pitch diameters of the countershaft gear 36 and the output gear 26.

A further reverse speed ratio for the output shaft may be obtained by shifting of the output clutch C to the left to establish engagement at 64—42T, whereupon the speed of the output shaft in a reverse direction is determined by the ratio between the pitch diameters of the countershaft gear 21 and the output shaft gear 42, including of course the ratio between the gears 48 and 15. In each case, of course, the speed depends initially upon the ratio between the reverse pinion 12 and the output gear 48, but since these two gears are in constant mesh, the ratio is assumed.

A fourth reverse speed may be obtained by shifting of the output shaft clutch C to the right to establish engagement at 64—33T, whereupon the output shaft is driven from the countershaft via the countershaft gear 23 and the output gear 33. Thus, the output shaft may be driven at any one of four speeds in reverse, which four speeds correspond to four of the forward speeds. Because of the high-low range result effected by the high-low range clutch A, there are twice as many forward speeds as there are reverse speeds, but in most cases the need for a plurality of reverse speeds is not as great as the need for more forward speeds.

A further feature of the invention resides in a novel power take-off shaft arrangement. In the present case, a power take-off input pinion 14P is coaxial with the input shaft, being preferably formed as part of a sleeve 76 that surrounds the right-hand end of the input shaft. The sleeve 76 as well as the input shaft may derive power from separate sources, many examples of which are conventional and need no illustration here, since they do not per se form any part of the present invention. Suffice it to say that the power take-off shaft pinion 14P is in constant mesh with a power take-off idler 46P journaled on the right-hand end of the output shaft. The true position of the power take-off idler 46P is illustrated in dotted lines in Fig. 3, it being recalled that Fig. 3 is a developed section. Likewise, the true position of the output gear 42 is illustrated in dotted lines in Fig. 3, but the specific illustration as to the output gear 42 has no particular significance here, since the gear 42 meshes only with the countershaft gear 21 and not with any other gear. On the other hand, the dotted-line positions of the output shaft gear 48 and the power take-off idler 46P are important because these gears mesh respectively with the reverse pinion 12 and the power take-off pinion 14P.

A power take-off shaft, labeled "PTO" has keyed thereto a gear 29 which is driven by the power take-off idler 46P. Thus, the power take-off arrangement is achieved without the use of additional shafts, utilizing, as seen, the front or right-hand end of the output shaft as a journal for the idler 46P.

Specific features of the invention not categorically enumerated herein, as well as broader aspects of the invention clearly apparent from the disclosure, will undoubtedly occur to those versed in the art, as will various modifications and alterations in the preferred embodiment of the invention illustrated, all of which may be achieved without a departure from the spirit and scope of the invention.

What is claimed is:

1. A change-speed transmission, comprising: an input shaft; a parallel countershaft; a parallel output shaft; a large input pinion and a small input pinion separately journaled on the input shaft in axially spaced relation and constrained against axial shifting; a small countershaft gear and a large countershaft gear fixed to the countershaft in axially spaced relation and in constant mesh respectively with the large and small input pinions; a dual-range clutch axially slidably keyed to the input shaft between the input pinions and selectively shiftable to opposite sides of a neutral position for optional engagement with the input pinions to drive the countershaft in one direction at either of two speeds; first and second output gears separately journaled on the output shaft in axially spaced apart relation and in constant mesh respectively with the large and small countershaft gears; a third countershaft gear fixed to the countershaft; a third output gear journaled on the output shaft in axially spaced relation to the first output gear and in constant mesh with the third countershaft gear; a first output clutch axially slidably keyed to the output shaft between the first and third output gears and selectively shiftable to opposite sides of a neutral position for optional engagement with said first and third output gears; a fourth output gear journaled on the output shaft in axially spaced relation to the second output gear; a fourth countershaft gear fixed to the countershaft and in constant mesh with the fourth output gear; a second output clutch axially slidably keyed to the output shaft between the second and fourth output gears and selectively shiftable to opposite sides of a neutral position for optional engagement with said second and fourth output gears; a reverse pinion journaled on the input shaft and in constant mesh with the third output gear; and a reverse clutch axially slidably keyed to the input shaft and selectively shiftable from a neutral position for engagement with the reverse pinion to drive said third output gear in a reverse direction and simultaneously via said third output gear to drive the countershaft in a reverse direction whereby the output shaft may be clutched directly to the third output gear or to the reversely rotating countershaft via the first, second or fourth output gears.

2. A change-speed transmission, comprising: an input shaft; a parallel countershaft; a parallel output shaft; a large input pinion and a small input pinion separately journaled on the input shaft in axially spaced relation and constrained against axial shifting; a small countershaft gear and a large countershaft gear fixed to the countershaft in axially spaced relation and in constant mesh respectively with the large and small input pinions; a dual-range clutch axially slidably keyed to the input shaft between the input pinions and selectively shiftable to opposite sides of a neutral position for optional engagement with the input pinions to drive the countershaft in one direction at either of two speeds; first and second output gears separately journaled on the output shaft in axially spaced apart relation and in constant mesh respectively with the large and small countershaft gears; a third countershaft gear fixed to the countershaft; a third output gear journaled on the output shaft in axially spaced relation to the first output gear and in constant mesh with the third countershaft gear; a first output clutch axially slidably keyed to the output shaft between the first and third output gears and selectively shiftable to opposite sides of a neutral position for optional engagement with said first and third output gears; a second output clutch axially slidably keyed to the output shaft adjacent to the second output gear and selectively shiftable from a neutral position for optional engagement with said second output gear; a reverse pinion journaled on the input shaft and in constant mesh with the third output gear; and a reverse clutch axially slidably keyed to the input shaft and selectively shiftable from a neutral position for engagement with the reverse pinion to drive said third output gear in a reverse direction and simultaneously via said third output gear to drive the countershaft in a reverse direction whereby the output shaft may be clutched directly to the third output gear or to the reversely rotating countershaft via the first or second output gears.

3. The invention defined in claim 2, including: a power take-off input pinion coaxial with and rotatable relative to the aforesaid input shaft; a power take-off idler gear journaled on the output shaft and in constant mesh with the power take-off pinion; and a power take-off output gear driven by the power take-off idler.

4. The invention defined in claim 2, including: speed-synchronizing means in the dual-range clutch to facilitate selection of high- or low-speed drive to the countershaft as a step-up or step-down drive while either of the output clutches is engaged.

5. The invention defined in claim 4, including: a fourth gear fixed to the countershaft; a fourth output gear journaled on the output shaft and in constant mesh with the fourth countershaft gear; and a fourth output clutch element coaxial on the output shaft and selectively and exclusively operative to connect the output shaft to the fourth output gear to afford a fourth speed for the output shaft in one direction at either speed of the countershaft and a fourth reverse speed for the output shaft when the countershaft direction is reversed.

6. A change-speed transmission, comprising: an input shaft, a parallel countershaft, and a parallel output shaft; first, second and third gears keyed to the countershaft; first and second output gears on the output shaft; selectively engageable and disengageable dual-range means cooperative between the input shaft and countershaft for driving the countershaft at either low or high speed in one direction; a reverse pinion coaxial with the input shaft; a third output gear journaled on the output shaft and in constant mesh with both the reverse pinion and the third countershaft gear; selectively engageable and disengageable reverse means for driving the reverse pinion from the input shaft when the dual-range means is disengaged, whereby to drive the countershaft through the third output gear at one speed in a reverse direction; and selective output speed-change means for establishing any one of a plurality of speed ratios between the output shaft and the countershaft via said first, second and third countershaft and output shaft gears in either speed of rotation of the countershaft in one direction or at said one speed of the countershaft in said reverse direction.

7. A change-speed transmission, comprising: an input shaft, a parallel countershaft and a parallel output shaft; a low-speed pinion, a high-speed pinion and a reverse pinion independently journaled on the input shaft; a low-speed gear and a high-speed gear fixed to the countershaft and in constant mesh respectively with the low- and high-speed input pinions, and a third gear fixed to the countershaft in radial alinement but out of mesh with the reverse pinion; first and second gears independently journaled on the output shaft and in constant mesh respectively with the low- and high-speed countershaft gears, and a third gear independently journaled on the output shaft and in constant mesh with both the reverse pinion and the third countershaft gear; low- and high-speed clutch elements coaxial on the input shaft and selectively and exclusively operative to connect the input shaft to either of the low- and high-speed pinions so as to drive the countershaft in one direction at either low or high speed; reverse clutch means coaxial on the input shaft and selectively disengageable from the reverse pinion while either of the low- or high-speed clutch elements is connected or engageable with the reverse pinion while said low- and high-speed clutch elements are disconnected, whereby to drive the third output gear in a reverse direction and simultaneously via said third output gear to drive the countershaft in a reverse direction at one speed; and first, second and third output clutch elements coaxial on the output shaft and selectively and exclusively operative to connect the output shaft respectively to the first, second and third output gears, whereby the output shaft may be driven at any one of three speeds in one direction for each speed of the countershaft when one or the other of the low- and high-speed clutch elements is connected and the reverse clutch element is disengaged, or at any one of three reverse speeds when the reverse clutch element is engaged and both low- and high-speed clutch elements are disengaged.

8. A change-speed transmission, comprising: an input shaft, a parallel countershaft, and a parallel output shaft; a small countershaft gear, an intermediate countershaft gear, and a large countershaft gear axially spaced on and fixed to the countershaft; a plurality of output gears independently journaled on the output shaft, including a large output gear in constant mesh with the small countershaft gear, an intermediate output gear in constant mesh with the intermediate countershaft gear, and a small output gear in constant mesh with the large countershaft gear; a plurality of independent clutch elements on the output shaft and selectively shiftable from disengaged positions to engaged positions connecting the output shaft exclusively to one of the output gears for driving the output shaft from the countershaft at a speed ratio afforded by the connected output gear and its constantly meshed countershaft gear; dual-range drive means for driving the countershaft from the input shaft in one direction but at either a high speed or a low speed, including the large and intermediate countershaft gears and high- and low-speed elements on and driven by the input shaft and selectively and exclusively shiftable from disengaged positions to engaged positions for optionally driving one or the other of said large and intermediate countershaft gears; and reverse drive means for driving the countershaft in a reverse direction at one speed, including the small countershaft gear, the large output gear and a reverse clutch element on and driven by the input shaft and shiftable from a disengaged position, while either of the high- and low-speed clutch elements is engaged, to an engaged position, when said high- and low-speed clutch elements are disengaged, in which the input shaft directly drives the large output gear which in turn reverses the direction of the countershaft via the constant mesh between said large output gear and the small countershaft gear.

9. A change-speed transmission, comprising: an input shaft, a parallel countershaft, and a parallel output shaft; a small countershaft gear, an intermediate countershaft gear, and a large countershaft gear axially spaced on and fixed to the countershaft; a plurality of output gears independently journaled on the output shaft, including a large output gear in constant mesh with the small countershaft gear, an intermediate output gear in constant mesh with the intermediate countershaft gear, and a small output gear in constant mesh with the large countershaft gear; a plurality of independent clutch elements on the output shaft and selectively shiftable from disengaged positions to engaged positions connecting the output shaft exclusively to one of the output gears for driving the output shaft from the countershaft at a speed ratio afforded by the connected output gear and its constantly meshed countershaft gear; dual-range drive means for driving the countershaft from the input shaft in one direction but at either a high speed or a low speed, including the large and intermediate countershaft gears and high- and low-speed elements on and driven by the input shaft and selectively and exclusively shiftable from disengaged positions to engaged positions for optionally driving one or the other of said large and intermediate countershaft gears; and reverse drive means for driving the countershaft in a reverse direction at one speed, including the small countershaft gear, the large output gear, a pinion journaled on the input shaft and in constant mesh with the large output gear, and a reverse clutch element axially slidably keyed on the input shaft and shiftable from a disengaged position, while either of the high- and low-speed clutch elements is engaged, to a position of engagement with the reverse pinion, when said high- and low-speed clutch elements are disengaged, to drive the large output gear directly from the reverse pinion and thereby to reverse the direction of the countershaft via said constantly meshed large output gear and small countershaft gear.

10. A change-speed transmission, comprising: an input shaft, a parallel countershaft, and a parallel output shaft; a small countershaft gear, an intermediate countershaft gear, and a large countershaft gear axially spaced on and fixed to the countershaft; a plurality of output gears independently journaled on the output shaft, including a large output gear in constant mesh with the small countershaft gear, an intermediate output gear in constant mesh with the intermediate countershaft gear, and a small output gear in constant mesh with the large countershaft gear; a plurality of independent clutch elements on the output shaft and selectively shiftable from disengaged positions to engaged positions connecting the output shaft exclusively to one of the output gears for driving the output shaft from the countershaft at a speed ratio afforded by the connected output gear and its constantly meshed countershaft gear; dual-range drive means cooperating between the input shaft and the countershaft for driving the countershaft from the input shaft in one direction but at either a high speed or a low speed, including high- and low-speed elements driven by the input shaft and selectively and optionally effective to connect and disconnect the input shaft and the countershaft; and reverse drive means for driving the countershaft in a reverse direction at one speed, including the small countershaft gear, the large output gear and a reverse clutch element on and driven by the input shaft and shiftable from a disengaged position, while either of the high- and low-speed clutch elements connects the input shaft and countershaft, to an engaged position, when said high- and low-speed clutch elements disconnect the input shaft and countershaft, in which the input shaft directly drives the large output gear which in turn reverses the direction of the countershaft via the constant mesh between said large output gear and the small countershaft gear.

No references cited.